United States Patent

[11] 3,591,723

[72] Inventor Giorgio Dal Monte
Milan, Italy
[21] Appl. No. 728,200
[22] Filed May 10, 1968
[45] Patented July 6, 1971
[73] Assignee Societa Italiana Telecommunicazioni
Siemens S.P.A.
Milan, Italy
[32] Priority May 11, 1967, May 29, 1967
[33] Italy
[31] 15,961 and 16,620

[54] CENTRALIZED IDENTIFICATION AND DEBITING SYSTEM FOR TELEPHONE SUBSCRIBERS
6 Claims, 4 Drawing Figs.

[52] U.S. Cl. .......... 179/7
[51] Int. Cl. .......... H04m 15/18
[50] Field of Search .......... 179/7 MM, 7, 7.1

[56] References Cited

UNITED STATES PATENTS 2,913,527 11/1959 Wright et al. .......... 179/7
3,160,709 12/1964 Burke .......... 179/7

FOREIGN PATENTS 959,826 6/1964 England .......... 179/7

*Primary Examiner*—Kathleen H. Claffy
*Assistant Examiner*—Jan S. Black
*Attorney*—Karl F. Ross

ABSTRACT: A central memory in a telephone exchange contains, in storage sections assigned to individual subscribers, binary words representing the current balances of their respective accounts together with possible classification information. An input multiple, whose leads are selectively energizable by a line finder in the presence of an incoming call, addresses the storage section assigned to the calling subscriber and concurrently transmits an identification of this subscriber to a code register. The input multiple also receives, in the case of a toll call, counting pulses from a called subscriber to indicate the amount of the toll to be debited to the calling subscriber, each counting pulse causing the contents of the addressed storage section to be read out and promptly reinscribed after augmentation by one unit; readout or augmentation is inhibited whenever the energization of the input multiple is due to an interrogation pulse occurring upon seizure of the register.

Giorgio Dal Monte
INVENTOR.

BY

Karl F. Ross
Attorney

CENTRALIZED IDENTIFICATION AND DEBITING SYSTEM FOR TELEPHONE SUBSCRIBERS

My present invention relates to a communication system, such as a telephone, telegraph or teletype network, wherein lines from a multiplicity of subscribers are connected to a central office or exchange for the selective establishment of toll call connections therebetween. The term "toll call," as herein used, refers to any communication for which the account of the calling subscriber is debited with one or more units of charge; in many instances this involves only long-distance calls, as distinct from free calls to the business office and local calls whose cost may be included in the basic monthly subscription rate.

In conventional telecommunication systems of this nature it is customary to provide an individual rate counter at the central-office terminus of each subscriber line, the counter being stepped by rate pulses over an established connection in the event of a toll call originated at that line. If local calls are subject to a unit charge, the counter receives a single rate pulse upon the establishment of a connection of this type; on long-distance calls the rate pulses follow one another with a frequency depending on distance. The periodic auditing of a subscriber's account thus requires a reading of the corresponding counter and a comparison with the previous reading to determine the amount due for the preceding accounting period.

The general object of my invention is to provide means for simplifying and accelerating this rather time-consuming auditing procedure.

A more particular object of my invention is to provide centralized means for identifying a calling subscriber and registering the toll charges debited to his account in the course of a call.

Let us consider a typical telephone exchange with 10,000 subscribers completing an average number of 12 calls per subscriber-day, the concentration during the hour of peak traffic being one-eighth of the total. If only every second attempt at establishing communication is successful, the subscriber-identification equipment must intervene at a maximum rate of $$\frac{10000 \cdot 12}{8 \cdot 0.5 \cdot 3600} \approx 8.4$$

times per second. If we further assume that the 12 daily calls of an average subscriber include 10 local calls and two long-distance calls chargeable at a mean rate of 20 units each, the counting in the hour of peak traffic is $$\frac{10000 \cdot [10 + (2 \cdot 20)]}{8 \cdot 3600} \approx 17.4$$

pulses per second. Thus, a combined computation and identification device at such a central office would be called into play at a maximum rate of about 26 operations per second, this being well within the capacity of present day electronic equipment including electronic memories of the magnetic-drum and ferrite-core types.

In accordance with an important feature of my present invention, I provide a centralized computer including a memory which is subdivided into a multiplicity of storage sections each assigned to a respective subscriber associated with the same central office. Each of these storage sections consists of enough units or elements (e.g. ferrite cores) to store, generally in binary form, an amount representing the current balance of the subscriber's account; with a memory section capable of storing 17 bits, for example, up to $2^{17}$=131,072 toll units can be registered. The memory is provided with input circuitry in the form of a set of code conductors multipled to all the storage sections which can thereby be individually addressed through selective energization of these conductors; the pattern of this energization represents a code signal identifying a calling subscriber as determined by central-office equipment, such as a line finder, responding to an incoming call. This equipment, in response to rate pulses arriving over an established connection, generates one or more counting pulses which energize the code conductors of the input multiple according to the identification number of the calling subscriber. If, for example, this number has up to four digits, a combination of not more than four code conductors will be energized by the counting pulse to address the memory section whose elements are connected to respond to this conductor combination. That memory section thereupon delivers its contents to a readout circuit which feeds the amount represented thereby to an arithmetic device including an adder which augments this amount by one toll unit before supplying it to a writing circuit for immediate reinscription in the same memory section. Thus, the current balance of the subscriber's account as stored in the assigned memory section is increased by as many toll units as there are rate pulses received over the established toll connection.

The same input circuitry is available to supply an identification of the calling subscriber to a recording unit at the central office, either upon the initiation of a call or in response to the first rate pulse after the connection has been established. In the first case there is generated an interrogation pulse upon the seizure of a register intended to record this information, the interrogation pulse being applied to the code conductors in the same manner as the subsequent counting pulses whereby the identification code can be read directly from these conductors into the register, with possible interposition of a translating unit for converting this information from a decimal code into a binary pulse train. At the same time, however, it is necessary to provide a circuit arrangement for making the computer ineffectual in the presence of the interrogation pulse, in order to prevent any augmentation of the stored balance before the arrival of the first rate pulse. This may be accomplished by temporarily preventing the readout of the memory or inhibiting the operation of the adder so that the stored amount is reinscribed unaltered.

The other solution will be particularly useful where the memory contains added preliminary information which relates to the calling subscriber and should be made available upon the initiation of a call. This additional information may concern the classification of the calling subscriber if some or all of the subscribers associated with this memory are grouped in special classes of service. Such classes may include, for example, subscribers with pushbutton selectors requiring the intervention of special equipment (e.g. a multiple-frequency generator) to establish a connection; official stations not subject to toll charges; or special users (e.g. coin-operated pay stations) which do not require a periodic statement of account. This classification information can be retrieved, pursuant to a further feature of my invention, from the memory in response to the interrogation pulse generated upon the initiation of a call, with or without concurrent identification of the calling subscriber.

In order that the addressing of the memory may proceed in a regulated manner and with optimum utilization of available circuitry, I prefer to make use of a pulse distributor which emits the aforedescribed interrogation and counting pulses in response to start and rate pulses from the connector but in a proper time sequence to rule out overlapping seizures by different callers. The same distributor may be called upon to provide an auditing pulse for the reading of an account in the absence of a call from the respective subscriber, with immediate reinscription of the unaltered balance or with inhibition of reinscription to reset the corresponding memory section at the beginning of a new accounting period. A suitable distributor of this kind has been disclosed in commonly owned application Ser. No. 707,341 filed Dec. 7, 1967 by Fabio Balugani and Franco Mammucaro, now U.S. Pat. No. 3,551,888. Such a distributor comprises an orthogonal matrix of coincidence gates under the control of respective row and column switches which respond in a predetermined sequence to identification signals from corresponding rows and columns of an orthogonal array of as many selector units as there are coincidence gates in the distributor matrix.

The above and other features of my invention will become more fully apparent from the following detailed description given with reference to the accompanying drawing in which.

Figure 1:
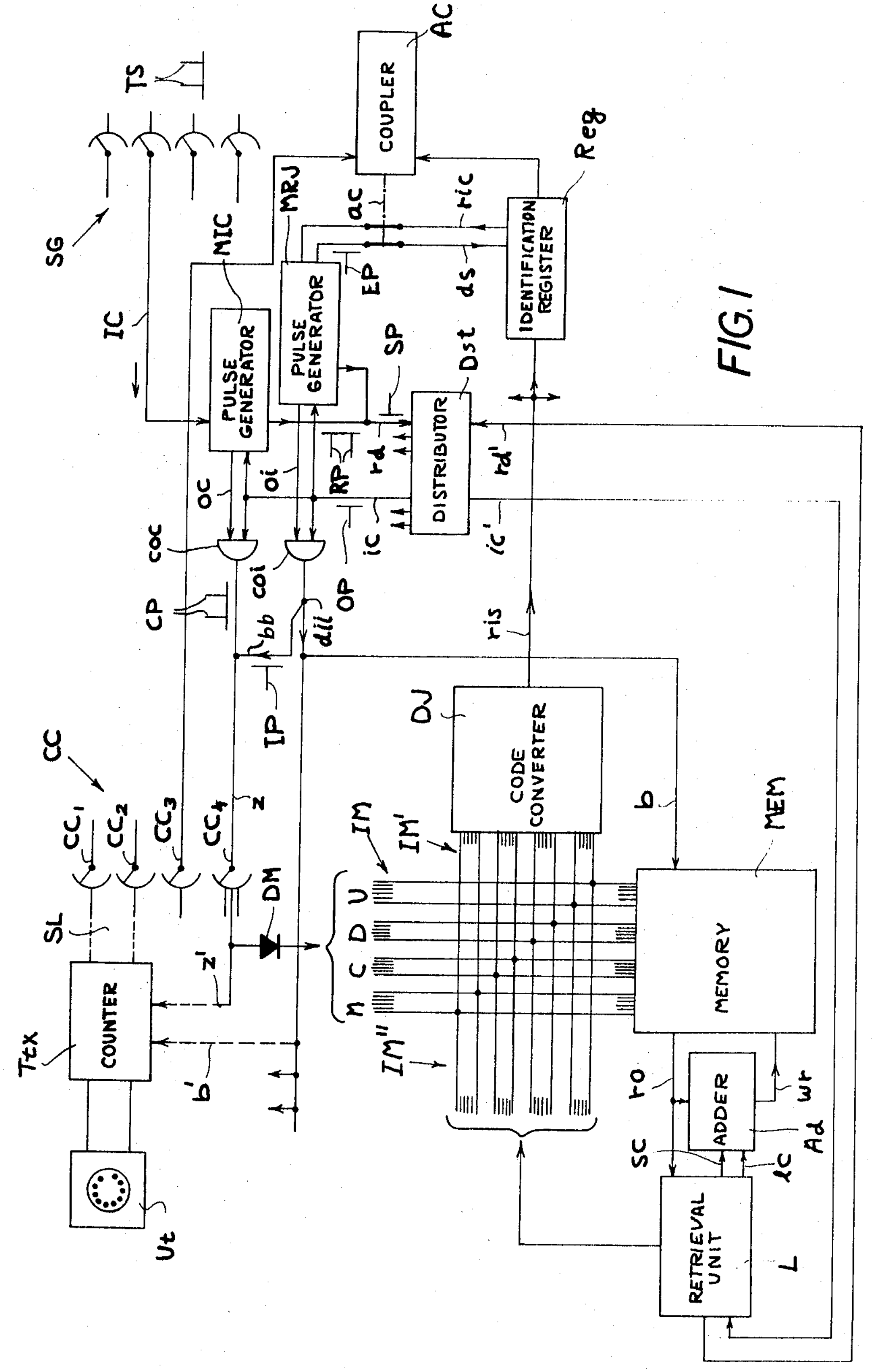
FIG. 1 is a circuit diagram of a communication system embodying the invention.

Reference will first be made to FIG. 1 which shows the equipment of a telephone exchange associated with a multiplicity of subscriber lines, one such line having been indicated at SL and terminating at a dial-equipped telephone set Ut. The line also includes a conventional rate counter Ttx, e.g. of the type known as "Teletax," which responds to pulses from the central office arriving over a wire z'. Counter Ttx may be disposed at the subscriber's location to enable the direct ascertainment of charges incurred by the user during a particular toll call.

The central-office equipment of the exchange includes a conventional line finder CC shown as a multilevel switch, only four levels $CC_1$, $CC_2$, $CC_3$ and $CC_4$ having been illustrated.

A similar multilevel switch forms a conventional selector SG designed to extend an incoming call to an outgoing trunk or subscriber line. A conductor IC, connected to a level of this selector, receives a toll signal TS which generally consists of one or more pulses whose cadence determines the toll charge per unit of time. Conductor IC terminates at a unit MIC which retransmits the pulses TS or otherwise responds to the toll signal to generate a train of rate pulses RP on a conductor rd leading to a distributor Dst; another output lead oc of pulse generator MIC carries, during transmission of pulses RP, a biasing potential applied to one input of an AND gate coc whose other input is connected to an output lead ic of distributor Dst. AND gate coc has an output lead z which terminates at the line finder level $CC_4$ and, in response to an incoming call from line SL, is extended by way of that level to wire z' thereof.

Another pulse generator MRJ, similar to unit MIC, has an output lead oi connected to one input of an AND gate coi whose other input is also connected to distributor lead ic; the output lead of gate coi is split at dii into two branches b and bb, branch bb joining the lead z from gate coc via a direct junction or an OR gate not shown. Lead b has an extension b' terminating at pulse counter Ttx of subscriber line SL and, in parallel therewith, at corresponding counters of other subscriber lines. Distributor lead ic is further connected to units MRJ and MIC for the purpose of controlling their operation and ultimately restoring them to cancel the gate-opening bias on the respective output leads oi and oc.

An identification register Reg is one of several such registers available for seizure, upon the initiation of a call from one of the associated subscribers, in response to a signal from line-finder level $CC_3$ which operates a coupler AC having contacts ac in series with two conductors ds and ric. Conventional circuitry, not further illustrated, is used to allow only one such register to be seized by the calling subscriber line and to cause thereupon the transmission of a dial tone to the subscriber. Distributor Dst is shown provided with additional input and output leads, corresponding to leads rd and ic, which extend to other combinations of pulse generators MIC and MRJ associated with other registers similar to unit Reg.

The closure of contacts ac applies to unit MRJ, via conductor ric, a conditioning voltage which triggers a start pulse SP on the input wire rd of distributor Dst. The distributor responds in due course with an output pulse OP on lead ic to stimulate the conditioned pulse generator MRJ into transmittal of an enabling pulse EP to the register Reg via lead ds.

Wire z' is connected, through a diode matrix diagrammatically indicated at DM, to an input multiple IM designed to identify a maximum of 9999 subscribers by the selective energization of four groups of 10 code conductors each, i.e. conductors U (units), D (tens), C (hundreds) and M (thousands). These conductors form the input of a memory MEM consisting, for example, of a multilevel ferrite-core array. The ferrite cores are threaded by these conductors in a pattern which divides the array into as many sections as there are subscribers, each section containing enough cores to store a binary word with a number of bits (e.g. 17) sufficient to register the current balance of any subscriber's account during an accounting period (e.g. 1 month). Multiple IM is also connected, via a group of similar conductors IM', to the input of a code translator DJ which converts the decimal code of the subscriber identification into a binary pulse train transmitted via a lead ris to the register Reg and all similar registers in parallel therewith.

Memory MEM has a readout circuit ro and a writing circuit wr interconnected by an adder Ad adapted, in a manner known per se, to increase the numerical amount fed in over circuit ro by a unit value before delivering this augmented amount to the circuit wr for reinscription in the storage section from which it was extracted. It will be understood that circuits ro and wr may each consist of a plurality of conductors threaded through corresponding cores of all the storage sections of memory MEM.

A retrieval unit L has an input connected to circuit ro and output lines sc, lc leading to adder Ad; other connections ic' and rd' extend between this unit L and the distributor Dst.

The construction of retrieval unit L will be described in greater detail hereinafter with reference to FIG. 4.

Whenever the subscriber Ut lifts the receiver off its hook, the conventional central-office equipment actuates an available line finder CC to connect the calling subscriber line SL to an available selector SG. When the wipers of the line finder stand on the bank contacts of the calling subscriber, coupler AC seizes the register Reg which, via lead ric, energizes the pulse generator MRJ so as to give rise to the start pulse SP. As soon as the distributor Dst is ready, it generates on wire ic the first output pulse OP which passes the coincidence gate coi, unblocked by a suitable biasing voltage on lead oi, whereupon an interrogation pulse IP appears in the output circuit b, bb of that gate. Lead b is a blocking wire which, in the presence of this interrogation pulse IP, inhibits the readout of any word stored in memory MEM; thus, the selective energization of the conductors of multiple IM by the same interrogation pulse via wires z, z' and diode matrix DM has no effect upon the computer MEM, Ad but actuates the code translator DJ to transmit the identification of subscriber Ut via lead ris to all the registers connected to that lead. At this point, however, only the register Reg responds to the pulse train on lead ris, being rendered receptive by the enabling pulse EP. Upon the disappearance of this enabling pulse P, the register Reg loaded with the information from translator DJ disconnects itself by releasing the coupler AC, thus removing its signal from the lead ric to restore the pulse generator MRJ to normal with resulting closure of gate coi.

The dialing pulses emitted by subscriber Ut control the selector SG to establish the desired connection to an outgoing line or trunk. When the called subscriber responds, a single pulse TS (in the event of a local call) or a train of such pulses (in the case of a long-distance connection) arrives over conductor IC and gives rise to an equal number of rate pulses RP on lead rd. Each rate pulse evokes from the distributor, on lead ic, an output pulse OP clearing the coincidence gate coc which at this point is unblocked by a suitable biasing voltage on lead oc, gate coi remaining blocked. Gate coc thus passes a counting pulse CP for each applied output pulse OP, the pulses CP traveling over leads z, z' and diode matrix DM to input multiple IM in the same manner as did the interrogation pulse IP. Since, however, blocking lead b is not energized at this time, the occurrence of a counting pulse causes a word to be read out over circuit ro from the section of memory MEM addressed by the multiple IM and assigned to the calling subscriber Ut, this word representing the current balance of the subscriber's account and being augmented by one bit in adder Ad before being reinscribed in the memory by way of circuit wr. The presence of a code signal in the input of converter DJ and of a corresponding pulse train on conductor ris is without effect since none of the identification registers tied to this conductor is enabled at that time.

Pulse generator MIC maintains the gate coc biased for conduction only for a short period substantially coinciding with the presence of a pulse OP on lead ic.

Owing to the presence of a blocking voltage of lead b', counter Ttx is prevented from responding to the interrogation pulse IP; the subsequent counting pulses CP, however, step the counter to register the charge of the toll call.

Figure 2:
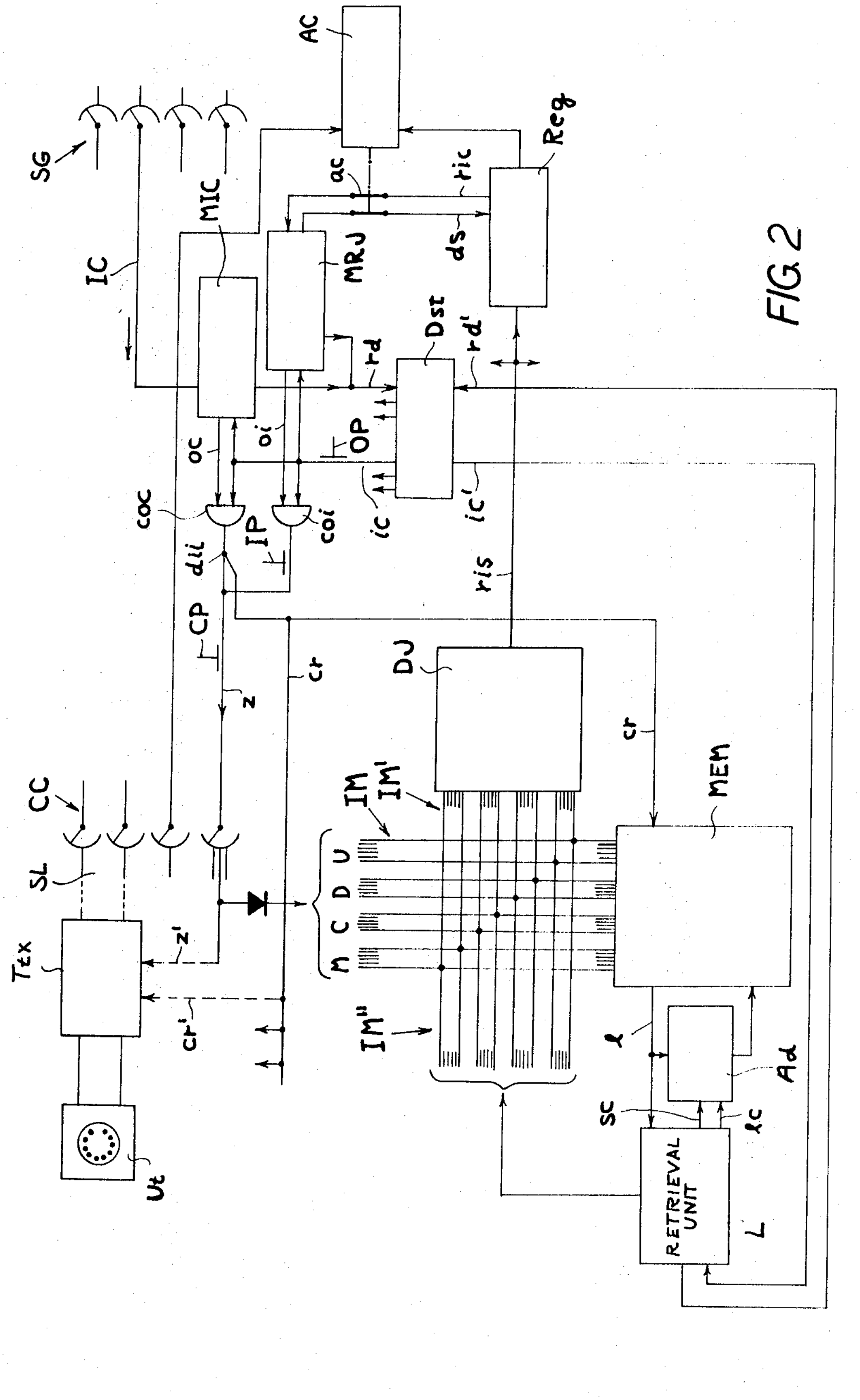
FIGS. 2 and 3 are diagrams generally similar to FIG. 1, illustrating certain modifications.

The system of FIG. 2 is generally similar to that of FIG. 1 and corresponding elements have been designated by the same characters. In this embodiment, however, the junction dii has been shifted to the output of AND gate coc from which an enabling lead cr branches out to memory MEM and, via an extension cr', to the counters Ttx of the several subscribers. Thus, the occurrence of an output pulse OP on distributor lead ic in the presence of a gate-opening voltage on lead oi gives rise to an interrogation pulse IP which energizes the input multiple IM but does not effectively address the memory MEM since the lead cr remains deenergized; on the other hand, the subsequent recurrence of this output pulse in the operative condition of unit MIC delivers a counting pulse CP to both the wire z and the enabling lead cr so that both the memory MEM and the counter Ttx of the calling subscriber Ut are conditioned to respond to this pulse in the aforedescribed manner.

Although the leads b' and cr' have been shown connected directly to the counter Ttx, with branches extending to other counters served by the system of FIG. 1 or 2, it will be apparent that a further level or group of levels of line finder CC may be inserted into this lead (in the manner shown) for level $CC_4$ and lead z) so that the blocking or enabling pulse will be confined to the calling line.

In the system of FIGS. 1 and 2 it has been assumed that the pulse generators MRJ and MIC are assigned to a single connector (combination of line finder and selector) so as not to be available for simultaneous actuation by incoming and outgoing lines concurrently engaged in different connections. If this is not the case, register Reg or unit MRJ may be provided with an additional output connection to pre-empt the unit MIC for exclusive energization via the lead IC of the selector SG engaged by the calling subscriber line SL; alternatively, the two units MRJ and MIC may be connected to different input and output leads of distributor Dst for independent actuation as described hereinafter with reference to FIG. 3.

The circuit arrangements of FIGS. 1 and 2 may be combined, for greater reliability of operation, by using both a blocking wire b branched off the output of gate coi and an enabling wire cr branched off the output of gate coc. In that case, the simultaneous presence of a pulse on both these wires would indicate a malfunction of the system.

Figure 3:
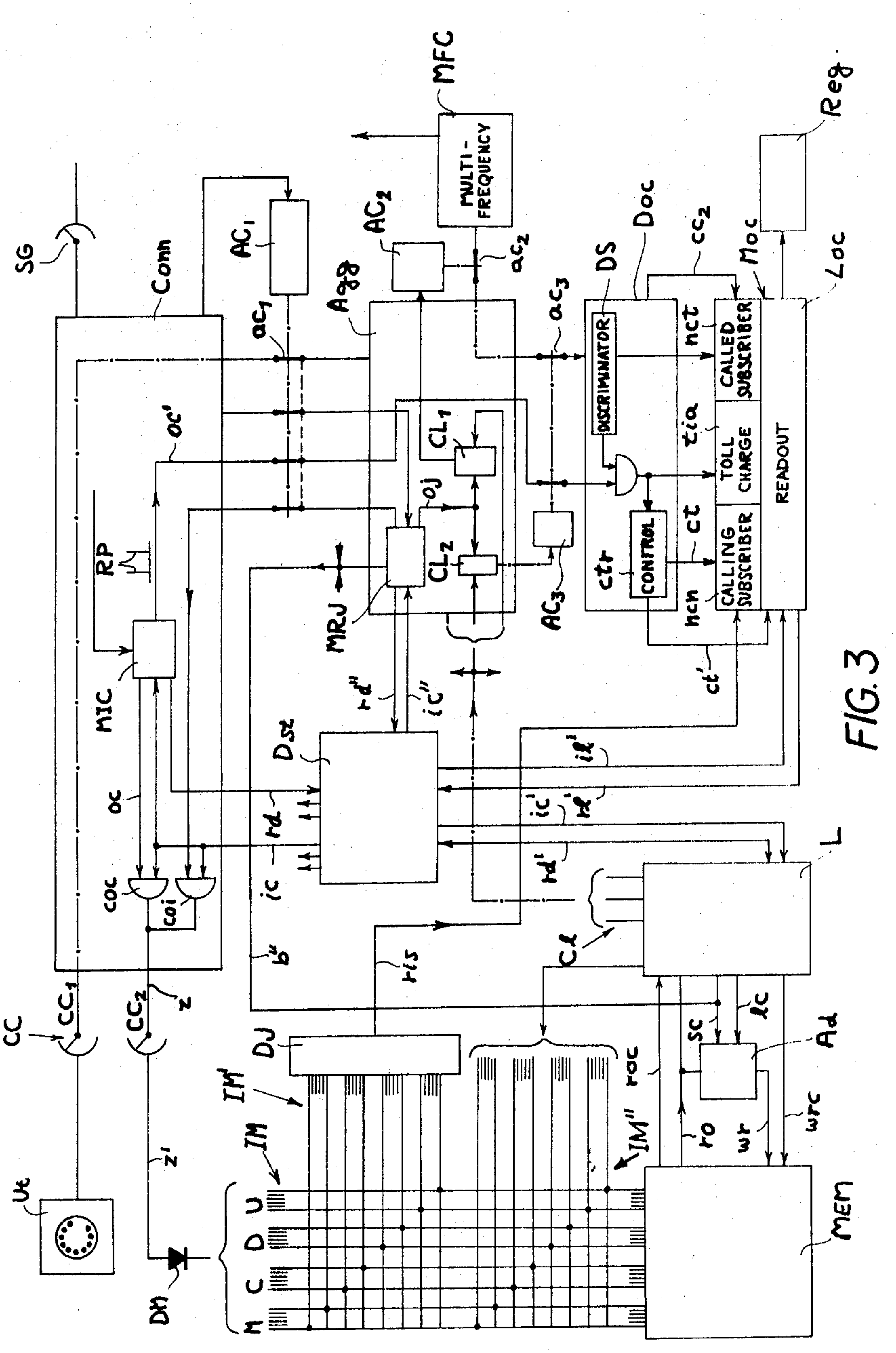

The system of FIG. 3 differs from those of the preceding Figures primarily by the presence of a classification selector Agg, a registration-control unit Doc and a buffer register Moc with readout unit Loc which, together with an associated registration unit Reg, form part of a recording stage of the exchange. Unit Reg, like the corresponding units in FIGS. 1 and 2, may comprise a tape perforator, a magnetic-tape recorder or any other conventional device for making a permanent record of a toll call for accounting purposes. Moreover, whereas in the aforedescribed systems the operation of this register was discussed only with reference to the recordal of the identity of the calling subscriber, it shall be assumed in connection with FIG. 3 that the record to be made consists of three parts, i.e. the identity of the calling subscriber, the number of toll units to be charged, and the identity of the called subscriber. These three parts are represented by corresponding subdivisions ncn, tia and nct of buffer register Moc.

Unit Agg is designed to discriminate between different classes of subscribers which may or may not require the establishment of a permanent record through the intervention of a register Reg. It will be assumed that a maximum of 15 classifications are to be identified with the aid of four additional bits stored in corresponding sections of memory MEM, these bits being read out by a circuit roc and reinscribed by a circuit wrc in a feedback connection which bypasses the adder Ad. The feedback loop extends through the retrieval unit L which delivers the classification information to a wire multiple cl. terminating at unit Agg, the latter including a plurality of responsive devices such as relays $CL_1$ and $CL_2$ (only two shown).

Figure 4:
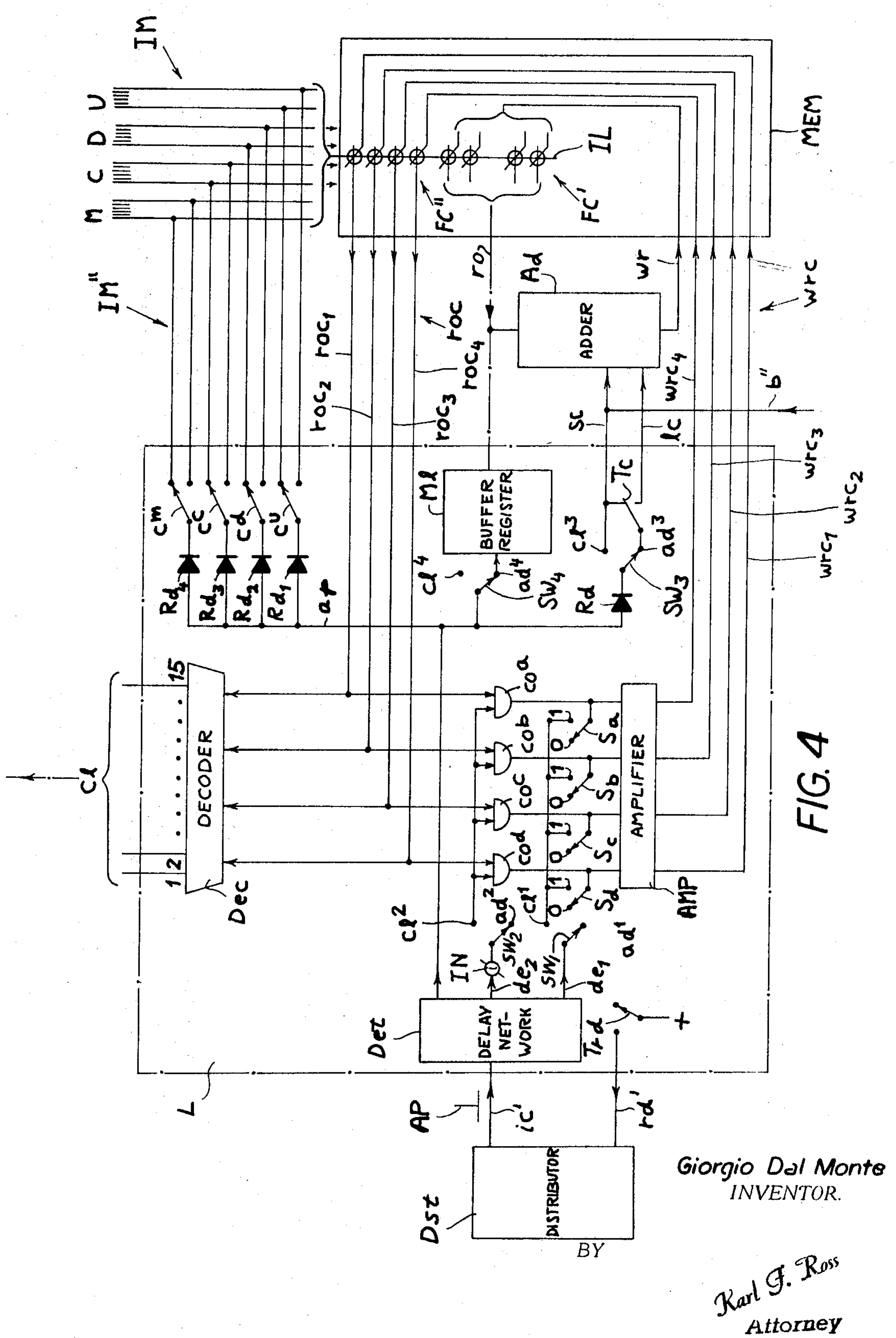
FIG. 4 is a more detailed diagram of several components of the system of FIG. 3.

As more specifically illustrated in FIG. 4, the circuit roc includes four readout wires $roc_1$, $roc_2$, $roc_3$ and $roc_4$, extending to a decoder Dec which converts the 4-bit word portion carried on these wires into a voltage on one of 15 conductors forming part of the multiple Cl. If a call originates with an unclassified subscriber, none of these conductors will be energized unless one combination of bits (other than 0000) is specifically assigned to all unclassified subscribers, the maximum number of distinct classes being reduced in this case to 14. It is, of course, also possible to provide an additional readout wire which is invariably energized upon the addressing of a memory section for the transmission of a definite output signal from decoder Dec which positively indicates the classification readout to unit Agg whereby also the combination 0000 can be made significant.

The block Conn of FIG. 3 represents the connector equipment disposed between the line finder CC and the selector SG. This equipment comprises, apart from conventional circuitry, the pulse generator MIC and the coincidence gates coc and coi described in connection with FIGS. 1 and 2. The other pulse generator MRJ is, however, now located within classification unit Agg and has an additional output lead oj extending to the relays $CL_1$ and $CL_2$ to condition them for energization by one of the conductors of multiple Cl during the preliminary stage immediately following the initiation of a call by subscriber Ut. This operation results in the seizure of an available classification unit Agg through the coupler $AC_1$ having contacts $ac_1$; pulse generator MRJ, linked with distributor Dst via a pair of wires rd'' and ic,'' is also connected, in parallel with similar pulse generators in other classification units, to a blocking lead b'' extending through the connection sc to the adder Ad of the computer.

The two classification relays $CL_1$ and $CL_2$ are seen, by way of example, to control respective couplers $AC_2$ and $AC_3$ having contacts $ac_2$ and $ac_3$; these relays may be operated, according to subscriber classification, individually, jointly or not at all. Contacts $ac_2$ are shown to extend to a multiple-frequency generator MFC which, in response to destination-indicating voltages from a subscriber equipped with a pushbutton selector in lieu of a dial, identifies a called subscriber by a succession of signals of distinct frequencies which actuate a local line selector or are transmitted over an outgoing trunk (via selector SG) to a distant exchange. Coupler $AC_3$ seizes an available registration-control unit Doc which is connected to the buffer register Moc and reader Loc working into the register Reg. Each unit Doc contains a controller ctr which responds to the first rate pulse RP on an output lead oc' of unit MIC to condition the subregister ncn, through a connection ct, for reception of the calling-subscriber identification transmitted by decoder DJ via lead ris. Controller ctr also has an output lead ct' connected to reader Loc for initiating a transfer of the contents of the relevant section of buffer register Moc to the permanent register Reg upon termination of the call. The rate pulses RP are entered in subregister tia directly from lead oc'.

Unit Doc further contains a discriminator DS which determines the nature of the connection sought to be established by the calling subscriber, i.e. whether it is a long-distance call or a local one. If, as is usually the case, a permanent record is to be made only for long-distance calls, the discriminator allows the passage of dial and rate pulses to register Moc only if the number of the called subscriber is preceded by an area code having a characteristic portion reserved for long-distance calls. In some countries this characteristic portion is the digit "O" in the first position; in the United States, generally, long-distance calls are characterized by a "O" or a "1" in second place. Thus, the discriminator Ds may include means for temporarily storing either the first digit or the first two digits which, upon verification, are then retransmitted along with subsequent digits to the subregister nct.

The initiation of a call by the subscriber Ut again causes operation of coupler $AC_1$ with actuation of pulse generator MRJ which transmits a start pulse to distributor Dst through lead rd'' and, in response to an output pulse on lead ic'', sends its interrogation pulse to line wire z by way of gate coi which is concurrently unblocked by a pulse on distributor lead ic, a blocking pulse appearing simultaneously on output lead b'' of generator MRJ. The computer MEM, Ad responds as before by feeding a code signal to translator DJ, the resulting pulse train on lead ris being, however, ineffectual since no section of subregister ncn is enabled at this time. Simultaneously, multiple Cl supplies the classification information to the ancillary unit Agg which contains the actuated pulse generator MRJ. If this classification information does not result in the operation of relay $CL_2$, the recorder Doc, Moc, Loc, Reg does not intervene; the contents of the memory section assigned to the calling subscriber will, however, be altered, as described above, in the case of a toll call.

If the classification relay $CL_2$ responds, coupler $AC_3$ goes into action and seizes a unit Doc. The dial pulses or other (e.g. pushbutton-generated) destination signals from the calling subscriber are now transmitted to discriminator DS and through it, in the case of a long-distance call, to the section of subregister nct assigned to the engaged control unit Doc. In the case of an abortive call, reader Loc does not operate and the entry in subregister nct is erased through a cancellation circuit $cc_2$ upon rupture of the connection between the calling subscriber and the equipment Conn.

If the called party responds, the first rate pulse emitted by pulse generator MIC elicits, as before, the appearance of a counting pulse on leads z, z' which energizes the corresponding memory section by way of input multiple IM. The word stored in the memory section addressed by the multiple IM is read out at circuits ro and roc, the amount of the balance of the subscriber's account is augmented in adder Ad as heretofore described, and the information extracted from the memory MEM is reinscribed via circuits wr and wrc. The pattern of energization of multiple IM is again communicated, through multiple IM', to code translator DJ to deliver a subscriber-identification pulse train to the subregister ncn which is now enabled by a concurrent pulse from controller ctr. At this point, therefore, the engaged section of buffer register Moc contains the identity of the calling subscriber at ncn, the identity of the called subscriber at nct and a count of one toll unit at tia. While the communication between the two subscribers is maintained, further rate pulses RP may be generated to increase the amount entered in subregister tia.

Pulse generator MRJ is restored to normal as before, prior to the inception of dialing; operated relay $CL_2$, however, does not release as long as the ancillary unit Agg is held busy by the coupler $AC_1$, i.e. until the call is terminated. Coupler $AC_3$ is then also deactivated to release the control unit Doc. This release triggers a signal on output lead ct' of controller ctr which stimulates the reader Loc to request, via a lead rl', the intervention of distributor Dst which thereafter emits a reading pulse on a lead rl' to authorize the transfer of the contents of this particular section of register Moc to unit Reg.

In this manner, owing to the presence of distributor Dst, several calls can be monitored simultaneously with suitable interleaving of the timing pulses which cause the various registration and transfer operations described above.

The same distributor may also be called into play to permit the auditing of the account of any subscriber and, in the system of FIG. 3, a changing of a subscriber's classification as will now be described with reference to FIG. 4. In that FIG., the memory MEM is shown to include a first group of ferrite cores FC with readout connections to circuit ro and a second group of such ferrite cores FC with readout connections to circuit roc, the two groups together forming a storage section served by a specific combination of input leads from multiple IM as indicated diagrammatically at IL. Circuit ro, itself a wire multiple, is connected to the input of adder Ad and in parallel therewith to a buffer register M1 which may be connected, in a manner not further illustrated, to any conventional display device enabling the visual ascertainment of its contents. A conductor multiple IM'', similar to multiple IM' and also shown in FIGS. 1—3, connects the conductors of groups U, D, C and M of multiple IM to respective bank contacts of four switches $c^u$, $c^d$, $c^c$ and $c^m$ in retrieval unit L which are separately settable, manually or otherwise (e.g. by remote control), to establish a desired pattern of energization of multiple IM upon the application of an auditing pulse AP from output lead ic' to a wire ap which is connected to these switches in parallel through respective rectifiers $Rd_1$, $Rd_2$, $Rd_3$ and $Rd_4$. The auditing pulse AP, reaching the wire ap through a delay network Det, is called forth from distributors Dst by a command signal applied to lead rd' by way of a circuit closer shown here diagrammatically as a key Trd; this key may again be operated locally or by remote control. Switches $c^u$, $c^d$, $c^c$ and $c^m$ could also be part of an automatic sequencer which, upon closure of contacts Trd, progressively steps these switches through all possible combinations so as to sample every storage section of memory MEM; the sequencer may be advanced by conventional means responsive to the trailing edge of an auditing pulse AP.

A selector switch in retrieval unit L has four ganged armatures $SW_1$, $SW_2$, $SW_3$ and $SW_4$ and alternately engageable with respective bank contacts $ad^1$, $ad^2$, $ad^3$, $ad^4$ or $cl^1$, $cl^2$, $cl^3$, $cl^4$. In its first ("auditing") position, this switch open-circuits two further outputs $de_1$, $de_2$ of delay networks Det, connects wire ap through a rectifier Rd to a switchover contact Tc, and further connects this wire to an enabling input of buffer register MI; switchover contact Tc extends this connection to either of the two control leads sc, lc of adder Ad. In the alternate ("classification") position of this selector switch, armature $SW_1$ connects output $de_1$ in parallel to the No. 1 bank contacts of four additional switches $S_a$, $S_b$, $S_c$ and $S_d$ which are connected through a group of direct-current amplifiers AMP to respective leads $wrc_1$, $wrc_2$, $wrc_3$, $wrc_4$ of the supplemental writing circuit wrc, the inputs of these amplifiers being also energizable from corresponding leads of the supplemental readout circuit roc via respective AND gates $co^a$, $co^b$, $co^c$ and $co^d$ whose other inputs are then connected by armature $SW_2$ to output $de_2$ which includes an inverter IN; at the same time the lead ap is connected via armature $SW_3$ to wire sc and is disconnected from buffer register MI at armature $SW_4$.

When the intervention of distributor Dst is solicited by the reversal of key Trd, it emits one or more auditing pulses AP (depending upon the duration of such reversal) between output pulses OP (FIG. 1) so that the operation of the retrieval unit L should not interfere with the identification and toll-registration operations previously described. Delay network Det causes a lengthened replica of each pulse AP to appear in its output $de_2$ so that, owing to the presence of inverter IN, the coincidence gates $co^a$—$co^d$ are blocked if switch armature $SW_2$ is on its "classification" contact $cl^2$. In that instance, the delayed appearance of pulse AP in output $de_1$ causes the reinscription of a new classification in the cores FC of the addressed memory section, according to the setting of switches $S_a$—$S_d$ which may also be actuated by an operator either directly or from a remote location. With switch armature $SW_3$ on its contact $cl^3$, adder Ad is inhibited but reinscription of the word portion stored in ferrite cores FC proceeds (without augmentation) via circuits ro and wr, irrespectively of the position of contact Tc. The buffer register MI is inoperative this time.

Normally, however, the system of FIG. 4 is in its "auditing" position in which the network Det does not perform any useful function, the slight delay imparted by it to pulse AP being without significance. The simultaneous arrival of a word portion from circuit ro and of an auditing pulse at contact ad[4] renders the buffer register Ml receptive to this word portion so as to facilitate the ascertainment and/or the automatic recordal of the current balance of the account selected by switches $c^u$, $c^d$, $c^c$, $c^m$. If contact Tc is in its illustrated position, adder Ad remains inhibited and reinscription proceeds as before; in the alternate position of that contact, the energization of wire lc not only inhibits the adder but also blocks retransmission of the extracted amount to the memory cores FC' via writing circuit wr.

Except for the group of ferrite cores FC and the associated feedback loop roc–wrc and decoder Dec, the retrieval unit L shown in FIG. 4 is also representative of the units so labeled in FIGS. 1 and 2. In these latter systems, however, there is no blocking lead b'' connected to wire sc although the circuit arrangement of FIG. 1 could be readily modified in this manner by a relocation of lead b. Similarly, lead cr of FIG. 2 could be connected to an enabling input of adder Ad rather than of the memory itself. Delay network Det is also omitted in the retrieval units L of FIGS. 1 and 2.

I claim:

1. In a communication system having a multiplicity of subscriber lines for making toll calls to be charged to the account of a calling subscriber, in combination:

- central-office equipment including a coupler responsive to an incoming call for establishing a toll connection between a calling line and a called line;
- input circuitry energizable by said equipment to generate a code signal identifying the calling subscriber;
- computer means including a memory with a multiplicity of storage sections each assigned to a respective subscriber and capable of storing an amount representing the current balance of the subscriber's account, said input circuitry extending to said memory for selectively addressing the storage section assigned to the subscriber identified by said code signal, said computer means further including readout means for extracting the amount stored in any storage section upon the addressing of such section by said input circuitry, writing means connected to said readout means for immediate reinscription of the extracted amount in the storage section so addressed, and arithmetic means inserted between said readout means and said writing means for augmenting said amount by one toll unit prior to reinscription;
- circuit means responsive to the establishment of a toll connection for applying to said input circuitry a number of counting pulses indicative of the number of toll units to be charged to the account of the calling subscriber, with resultant operation of said readout, arithmetic and writing means once per counting pulse to augment the amount stored in a section of said memory addressed by said input circuitry;
- an identification register available for seizure by said coupler for a limited period in response to said incoming call to register the identity of the calling subscriber;
- and a source of interrogation pulses in said circuit means responsive to seizure of said identification register for loading the latter during said limited period through the intermediary of said input circuitry prior to arrival of the first counting pulse, said circuit means being operative under the control of said identification register to make said computer means ineffectual in the presence of an interrogation pulse.

2. The combination defined in claim 1 wherein said circuit means comprises a first pulse generator and a second pulse generator, said equipment including a pulse distributor connected to both said pulse generators, said first pulse generator being actuatable by said equipment to transmit to said distributor a start pulse generating said interrogation pulse in the output of the distributor, said second pulse generator being actuatable by a toll signal on said called line to transmit to said distributor a train of rate pulses generating said counting pulses in the output of the distributor.

3. The combination defined in claim 2 wherein said equipment includes a linefinder, said input circuitry comprising a set of code conductors connectable to said circuit means via a part of said linefinder for selective energization thereby.

4. The combination defined in claim 3 wherein said memory is provided with a retrieval unit connected to said readout and writing means including switch means for selectively energizing said code conductors independently of said linefinder to address any one of said storage sections in response to an auditing pulse from said distributor, said retrieval unit being connected to said readout means for receiving the amount extracted from the section so addressed, said retrieval unit further including command means for triggering said distributor to emit said auditing pulse in the absence of a counting pulse and control means for inhibiting said arithmetic means to prevent the augmentation of the amount to be reinscribed upon a triggering of said distributor by said command means.

5. The combination defined in claim 4 wherein said retrieval unit includes selectively operable blocking means for deactivating said writing means to prevent reinscription of an amount transmitted to said retrieval unit.

6. The combination defined in claim 2 wherein said identification register is connected to said input circuitry in parallel with said memory means, said first pulse generator being coupled to said identification register for making same responsive to said code signal in the presence of said interrogation pulses.